United States Patent [19]

Maclean

[11] Patent Number: 4,568,458
[45] Date of Patent: Feb. 4, 1986

[54] FLUIDIZED BED REACTOR

[75] Inventor: Gregory W. Maclean, Sydney, Australia

[73] Assignee: Austgen-Biojet International Pty. Limited, Surry Hills, Australia

[21] Appl. No.: 661,627

[22] Filed: Oct. 17, 1984

[30] Foreign Application Priority Data

Oct. 17, 1983 [AU] Australia .............................. PG1886

[51] Int. Cl.⁴ ............................................. B01D 23/20
[52] U.S. Cl. ..................................... 210/197; 210/289; 210/291
[58] Field of Search ............... 210/289, 291, 150, 151, 210/617, 618, 197; 422/140

[56] References Cited

U.S. PATENT DOCUMENTS

| | | | |
|---|---|---|---|
| 1,867,572 | 7/1932 | Johnson | 210/289 X |
| 3,134,735 | 5/1964 | Greenleaf, Jr. | 210/289 X |
| 3,847,805 | 11/1974 | Voedisch | 210/291 X |
| 3,869,381 | 3/1975 | Graveland | 210/289 X |
| 4,075,102 | 2/1978 | Ferrin | 210/291 X |
| 4,152,266 | 5/1979 | Lazovsky et al. | 210/291 X |
| 4,211,656 | 7/1980 | Cochrane | 210/291 X |
| 4,265,767 | 5/1981 | Gappa et al. | 210/289 X |
| 4,379,050 | 4/1983 | Hess et al. | 210/151 |

FOREIGN PATENT DOCUMENTS

| | | | |
|---|---|---|---|
| 227240 | 5/1963 | Austria | 210/291 |
| 1036457 | 9/1953 | France | 210/291 |

Primary Examiner—Richard L. Chiesa
Attorney, Agent, or Firm—Millen & White

[57] ABSTRACT

A fluidized bed waste water treatment reactor which includes a reactor tank containing a particulate media, an array of perforated distribution pipes disposed in a horizontal, parallel array adjacent the bottom of the reactor tank for introducing fluidizing liquid substantially uniformly over the cross-sectional area of the reactor tank. The arrangement is characterised in that an inlet end of each of the distribution pipes extends externally of the reactor tank and the distribution pipes are connected together by a header tank positioned externally of the reactor tank. This arrangement allows access externally of the reactor tank to individual distribution pipes which allows blockages of the pipes to be readily cleared.

12 Claims, 6 Drawing Figures

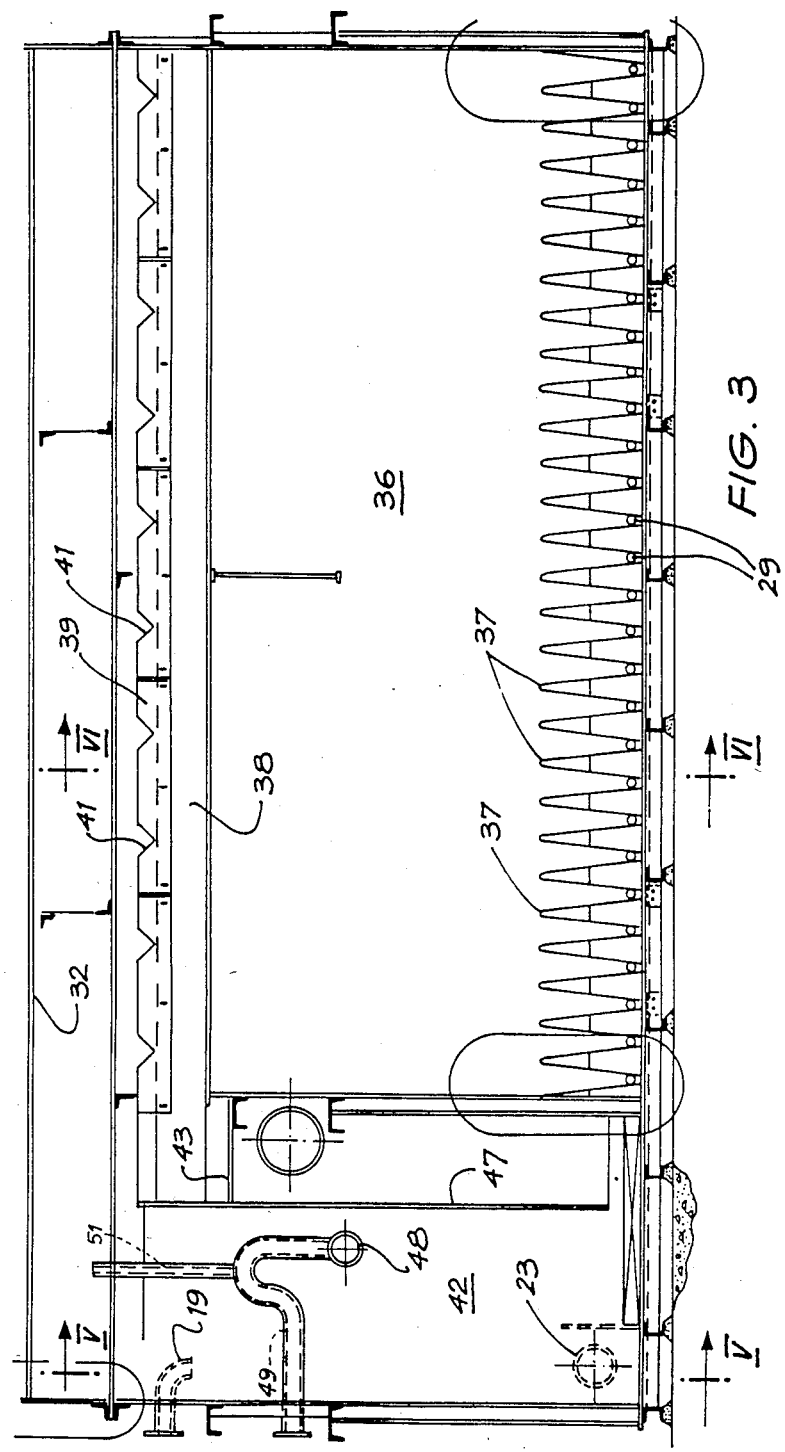

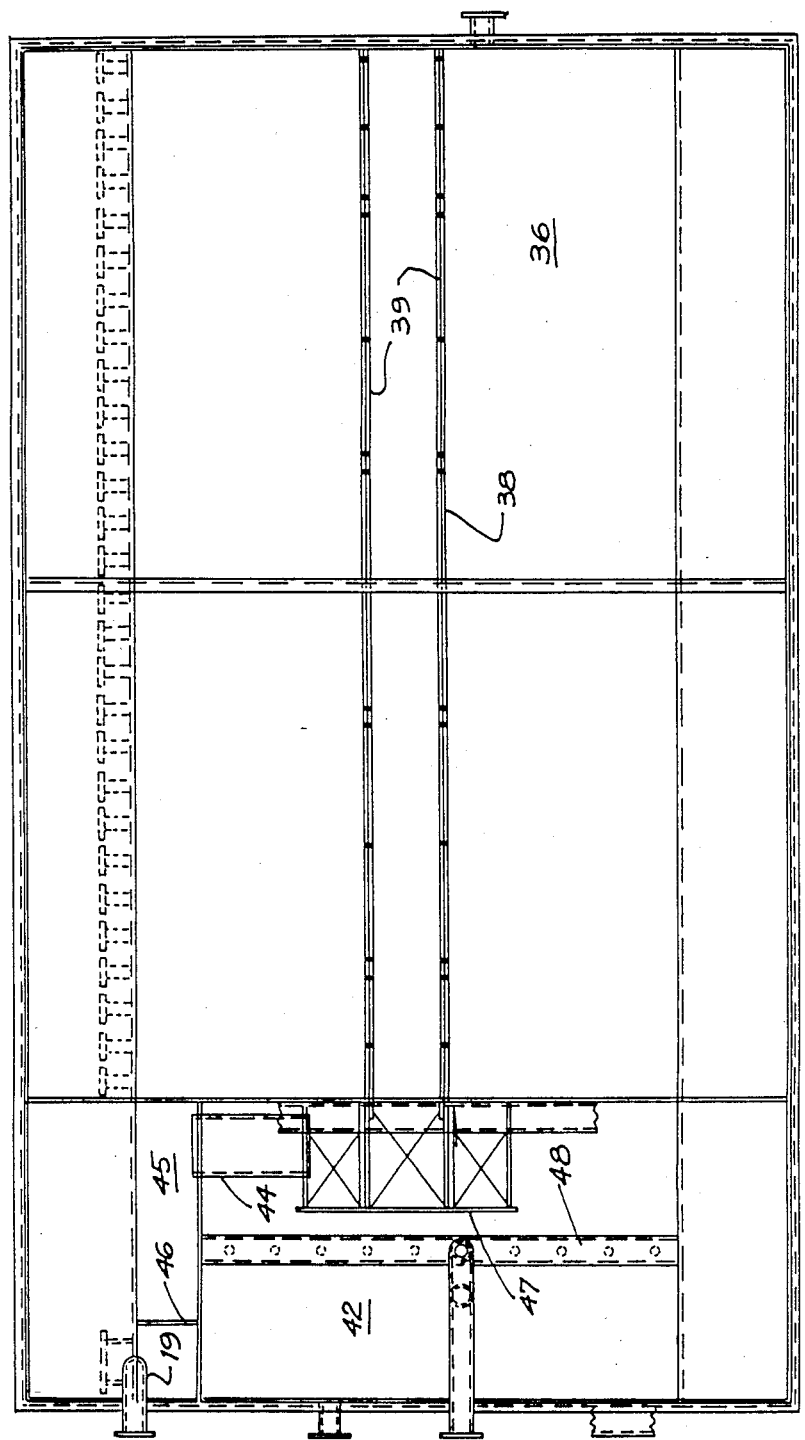

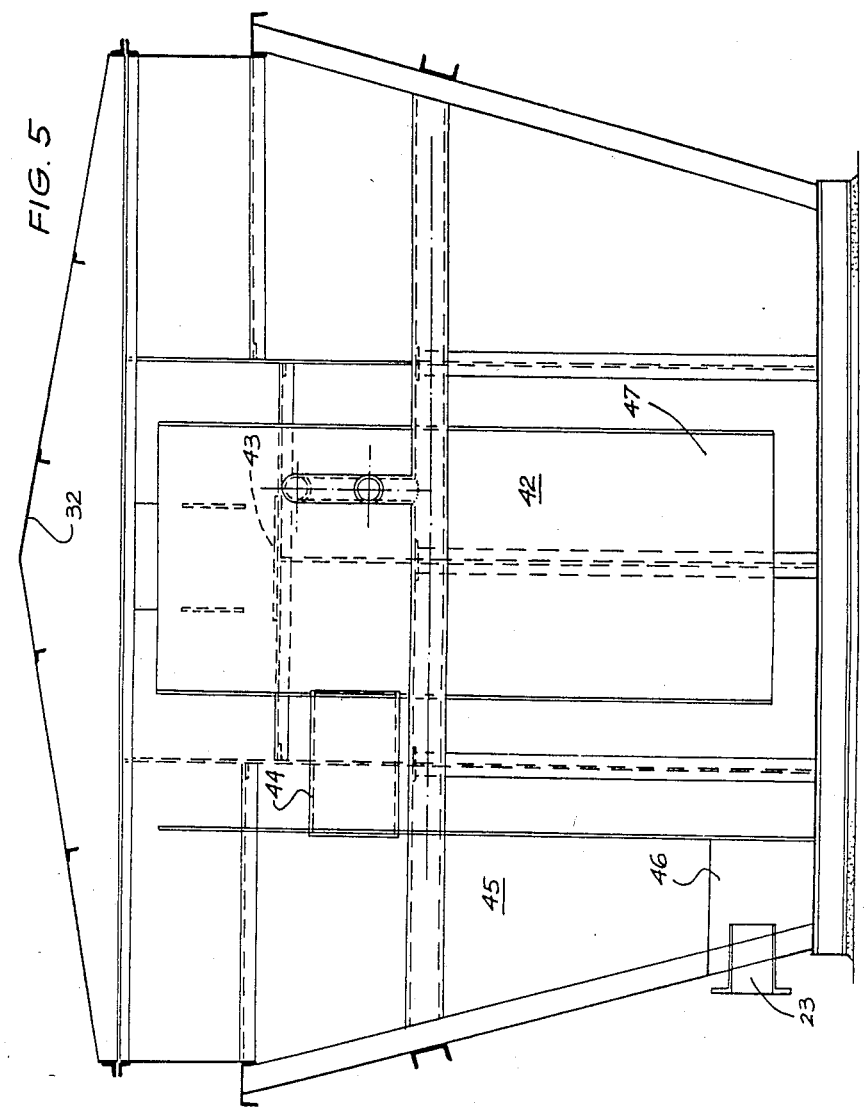

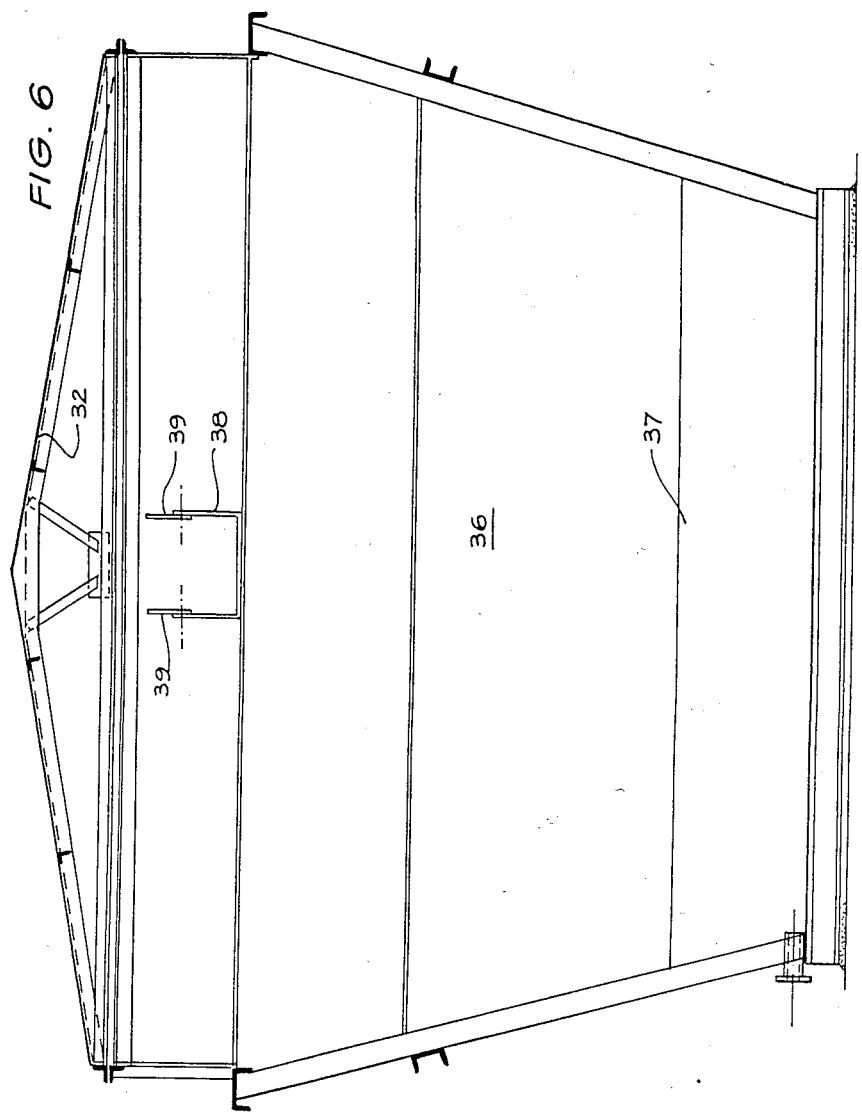

FLUIDIZED BED REACTOR

BACKGROUND OF THE INVENTION

The present invention relates to a fluidised bed waste water reactor and more particularly to such a reactor having novel features which facilitate operation and maintainance of the reactor.

Fluidised bed waste water reactors are known in which a bed of particulate matter such as sand is fluidised in a reactor tank by the upward flow of the waste water. The tank is seeded with a suitable bacterial population which attaches itself to the sand particles and grows thereon. In practice difficulty is experienced in obtaining and maintaining a stable fluidising flow of waste water to maintain the bed of sand particles in a fluidised state. It has been considered desirable when designing fluidised bed reactors to keep the ducting for recycling the waste water through the bed wholly within the reactor tank (see Australian Patent Specification No. 84684/82). This approach means that the distribution pipes are wholly within the reactor tank and therefore difficult to clean in the event that they become blocked. As the difficulties in obtaining and maintaining an evenly fluidised bed is in part caused by blocking of the orifices in the distribution pipes the difficulty in cleaning the pipes is a severe handicap. The present invention provides an arrangement which overcomes this known difficulty and also, independently, introduces a number of innovations in the design of fluidised bed reactors.

SUMMARY OF THE INVENTION

The present invention consists in a fluidised bed waste water treatment reactor, comprising a reactor tank containing particulate media, an array of perforated distribution pipes disposed in a substantially horizontal array adjacent the bottom of the reactor tank for introducing fluidising liquid substantially uniformly over the cross sectional area of the reactor tank, collection means to draw off liquid from adjacent the top of the reactor tank, a pump to recirculate the liquid drawn off by the collection means to the distribution pipes, inlet means to introduce waste water into the fluidised bed reactor and outlet means to discharge treated waste water from the fluidised bed reactor, characterised in that a header tank is positioned between the recirculation pump and the distribution pipes externally of the reactor tank and in that each distribution pipe leads off, individually, from the header tank externally of the reactor tank such that there is access to individual distribution pipes externally of the reactor tank.

The reactor tank is preferably rectangular in shape although tanks of other cross sectional shapes could be used. The upper part of the reactor tank is preferably of larger cross sectional area than the lower part. The flow rate of the waste water is thereby reduced in the upper part of the reactor tank and this helps prevent sand particles being carried out of the reactor tank. In a particularly preferred embodiment of the present invention the cross-sectional area of the reactor tank increases uniformly over an expansion zone within the reaction tank equal to at least half the total height of the reactor tank such that the cross-sectional area of the tank at the top of the expansion zone is at least 30% greater than the cross-sectional area at the bottom of the expansion zone.

In a conventional straight sided fluidised bed larger particles will tend to sink in the bed while the smaller ones will tend to rise. This classification of particles according to size is emphasised as commercially available media will generally have a relatively wide size distribution.

In anaerobic fluidized bed systems, particles rise to the top as they coat with low density biofilm material and in fact the fine particles already at the top of the bed tend to coat more rapidly because of the lower shear conditions existing there, lower electrostatic surface repulsion due to the lower radius of curvature, and a lower particle Reynolds number.

The biofilm initially consists of low density polysaccharide gums and the bed porosity can increase dramatically leading to carry over of particles. This condition can be rectified by using larger overall media particles for greater weighting effect, or preferably by expanding the cross-sectional area of the bed so that the superficial upflow velocity is progressively reduced, hence lowering porosity.

This has the further benefit of allowing a lower overall bed porosity or greater biomass densities in a fully seeded system. Calculations indicate for a linear increase in bed area of 50% at the top over the base for a bed 6 meters deep (overall) average biomass densities may be increased by up to 30%. In addition, the tapered bed allows the use of smaller overall media particles which also give a significant increase in biomass concentration and surface area together with lower upflow velocities and hence lower energy consumption when compared with competing systems. The medium size of the media proposed is 350 microns compared with 500–600 microns quoted in literature for alternative systems.

The distribution pipes are preferably disposed in a parallel array slightly above the floor of the reactor tank. These pipes preferably extend right across the width of the reactor tank and open outwardly through the opposite side walls of the reactor tank. In this arrangement one end of each distribution pipe is preferably capped or fitted with a stop valve, while the other end is connected to the header tank through another stop valve. The connection between the header tank and each distribution pipe preferably includes an angled connection such that by disconnection of the header tank from the distribution pipe free, straight line, access may be obtained to the inside of the distribution pipe. The distribution pipe may thus be rodded out or otherwise physically cleaned out right through its full length. To facilitate this cleaning process it is preferred that the distribution pipes all be straight.

The collection means may be any conventional system of perforated pipes or the like disposed adjacent the top of the reactor tank. It is preferred, however, that the collection means includes a launder running the length of the reactor tank. A weir on either side of the launder admits the waste water into the launder. As the liquid drops over the weir into the launder, release of any gas bubbles clinging to the sludge particles in the waste water will be facilitated. In anaerobically run systems the quantity of methane, carbon dioxide and other gases generated can be significant and efficient separation of the gas at the top of the reactor tank can avoid gas locks and like problems at other points in the system. Removal of the dissolved carbon dioxide is also desirable to reduce alkalinity requirements and possible scaling.

The liquid which flows into the launder is then preferably conducted along the launder to its downstream end where it falls onto a splash plate to further facilitate gas separation. The liquid is then preferably carried through a baffled settling tank in which it is flowed through a bed of substantially settled sludge before being discharged through the outlet means and/or to the recirculation pump. The passage through the sludge bed contributes further to the reduction in the BOD of the waste water.

The recirculation pump is connected at one end to the reactor tank and at the other end to the header tank. It is preferably connected to the header tank through isolation and non-return valves or through an anti-siphon loop.

The header tank is conveniently cylindrical however other suitable shapes could be used. The header tank is preferably at least as long as that part of the reactor tank in which the distribution pipes are disposed. The header tank is preferably disposed with its longitudinal axis horizontal and each of the distribution pipes connected to the underside of the header tank. Most preferably each distribution pipe extends a short way into the header tank such that solids which might otherwise drop into the distribution pipes will be trapped in the header tank below the open ends of the distribution pipes. An outlet is preferably provided in the header tank to allow in complete drainage to remove settled particulate matter therefrom.

The header tank serves to ensure an even distribution of the recirculating liquid to each of the distribution pipes and ensures that they are all operating at substantially the same pressure. This is believed to substantially assist in maintaining stability in the fluidised bed and in its efficient operation. Desirably the cross-sectional area of the header tank should be greater than the total cross-sectional area of the distribution pipes and the influent feed pipe enters the header tank substantially at right angles to the distribution pipe outlets to facilitate the achievement of the foregoing objectives.

In order to prevent gas accummulation in the distribution pipe it is preferred that each distribution pipe includes an upstanding collar inside the pipe surrounding at least one of the perforations therein. The perforations are preferably in the lower side of the pipe and the collar preferably extends upwardly to a position adjacent the inside surface of the pipe opposite the perforations. Any gas accummulated as bubbles along the upper surface of the pipe will be vented through the collar and the perforation. The collar is preferably positioned around a perforation adjacent the end of the distribution pipe distal to header tank as the gas bubbles are most likely to accummulate at that end of the distribution pipe.

A particularly preferred feature of the arrangement according to this invention lies in the provision in the bottom of the reactor tank of an array of baffles of triangular cross sectional shape. Preferably such a baffle is provided between each of the distribution pipes and is of a height at least four times, and preferably up to at least ten times, the distance between the floor of the reactor tank and the centre line of each distribution pipes. The baffles are preferably so placed that each distribution line is disposed in the apex of an elongate space of inverted triangular shape in cross section. If desired vertical plates may be provided at intervals along this space. The distribution pipes are preferably provided with downwardly directed holes at intervals along their lengths. The baffles cooperate with the downwardly directed holes to create a zone of high up-flow velocity at the bottom of the reaction tank. This high up-flow velocity is sufficient to cause rapid fluidization of the media particles and ensures quick and reliable fluidization of the bed. The shape of the triangular baffles is preferably so chosen that the flow expands uniformly and without turbulence such that by the time the flow reaches the top of the baffles the influent liquid is distributed in a substantially uniform manner over the entire bed cross-section. The arrangement of the baffles and holes also stop sand particles flowing back into the distribution pipes in the event that the pump stops and the fluidised bed settles. The arrangement also facilitates the reestablishment of the bed once the pump is started.

BRIEF DESCRIPTION OF THE DRAWINGS

Hereinafter given by way of example only is a preferred embodiment of the present invention described with reference to the accompanying drawings in which:

FIG. 3 is a longitudinal vertical sectional view on an enlarged scale through the reactor tank of the fluidised bed reactor of FIG. 1, FIG. 4 is a plan view of the reactor tank of FIG. 3, FiG. 5 is a transverse vertical sectional view along V—V of FIG. 3, and FIG. 6 is a transverse vertical sectional view along VI—VI of FIG. 3.

DETAILED DESCRIPTION OF THE DRAWINGS

Figure 1:
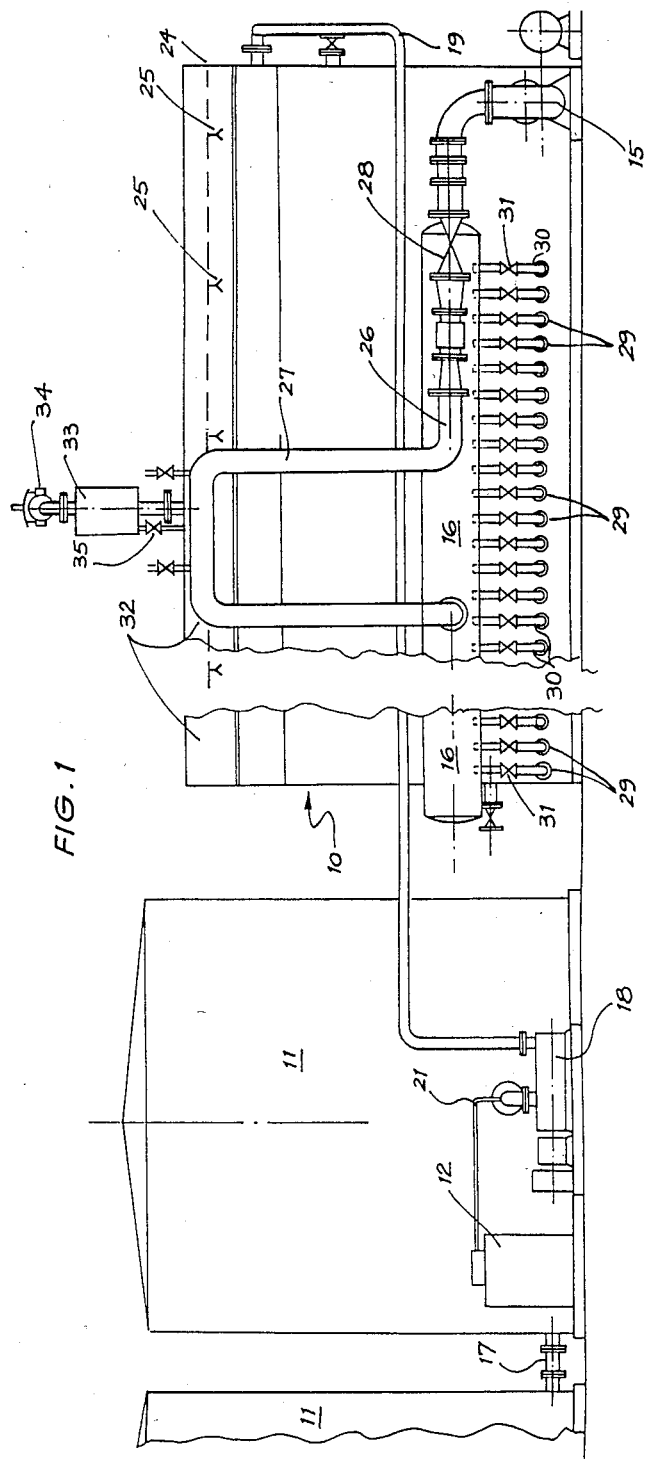
FIG. 1 is a side elevational view of a fluidised bed waste water reactor according to this invention.
Figure 2:
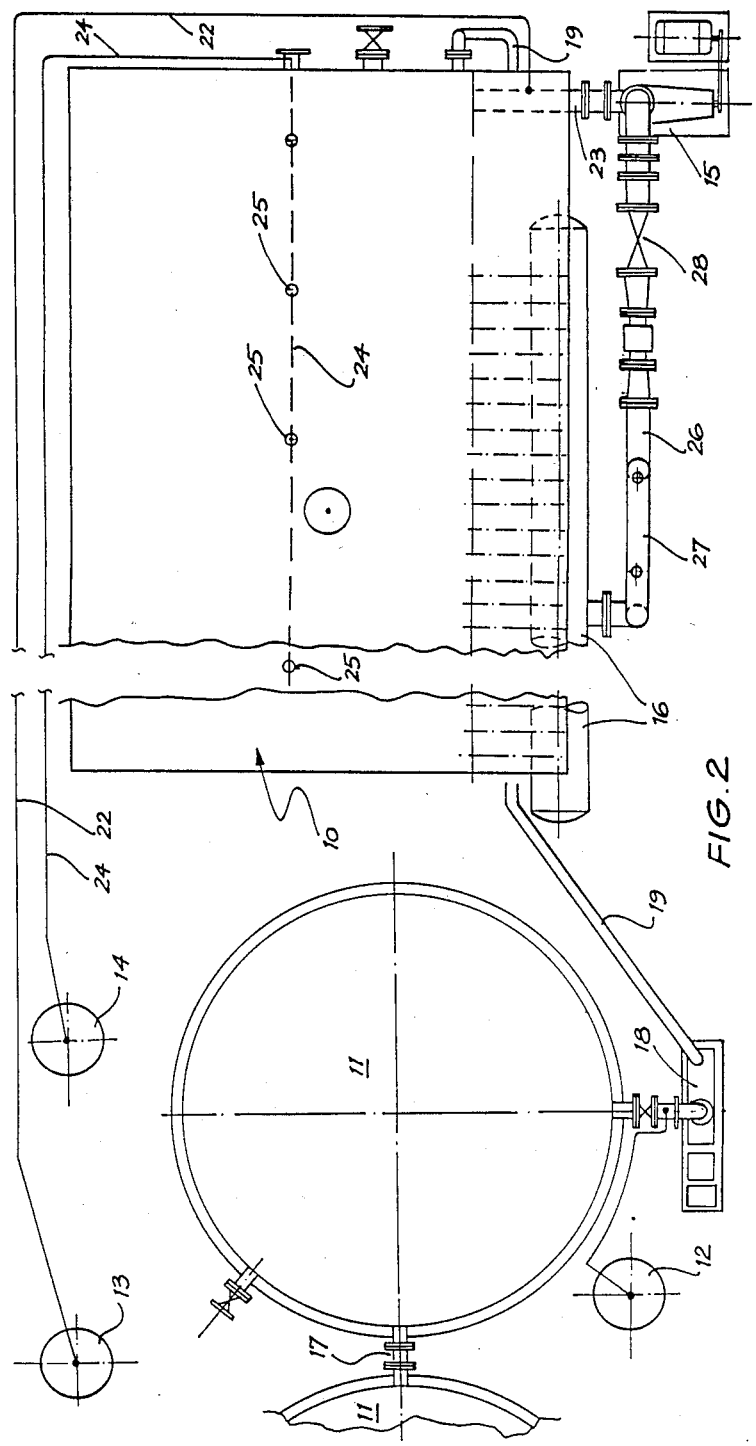
FIG. 2 is a plan view of the fluidised bed reactor of FIG. 1.

The fluidised bed reactor comprises a reactor tank 10, a pair of buffer tanks 11 to hold influent waste water, a nutrient storage tank and pump 12, an alkali storage tank and pump 13, an anti-foam storage tank and pump 14, a recirculation pump 15 and a header tank 16. Influent waste water is fed from the buffer tanks 11, which are joined by pipe 17, through an influent pump 18 and pipe 19 to the reactor tank 10. The nutrient tank and pump 12 feed a nutrient solution through pipe 21 into the influent stream just ahead of influent pump 18. The alkali storage tank and pump feed a neutralising alkali solution through pipe 22 into a pipe 23 carrying recirculating waste water from the reactor tank 10 to the recirculation pump 15. The anti-foam tank and pump feed an anti-foaming solution through pipe 24 into the headspace of the reactor tank 10 spray nozzles 25 positioned in the headspace are adapted to spray the anti-foaming solution onto the top of the waste water in the reactor tank 10.

The recirculation pump 15 pumps the recirculating waste water stream through pipe 26, which includes an anti-siphon loop 27 and a stop valve 28, to the cyclindrical header tank 16. Twenty eight distribution pipes 29 project upwardly through the underside of the header tank 16 and stand slightly to the side of the inner surface of the side wall thereof. Each of the distribution pipes 29 includes a stop valve 31 and below the stop valve a right angle elbow 30 such that the distribution pipes 29 extend horizontally, and in parallel array, into the reactor tank 10.

The reactor tank 10 includes a roof structure 32 on which is mounted a water trap 33 and gas pressure relief valve 34. A water trap drain line 35 returns condensed water to the reactor tank 10.

The reactor tank 10 includes a rectangular fluidised bed chamber 36 at one end. The distribution pipes 29 extend across the floor of the fluidised bed 36 and are spaced apart by triangular section baffles 37 extending across the full width of the fluidised bed chamber 36. The baffles extend upwardly by an amount of approximately ten times the distance between the floor of the fluidised bed chamber 36 and the center line of the distribution pipes 29. Holes are provided at spaced intervals in the underside of each of the distribution pipes 29 to introduce the recirculating waste water into the fluidised bed chamber 36. The distribution pipes 29 extend across the full width of the fluidised bed chamber and project through the side wall thereof distal to their point of entry into the chamber 36. The free end of each of the distribution pipes is fitted with a stop valve (not shown).

The fluidised bed chamber 36 contains sand or another fine particulate material which is fluidised by the inflowing waste water and on which the bacteria, on which the waste water treatment relies, can grow.

The width of the fluidised bed chamber 36 increases from the bottom to the top of the reactor tank such that the tank area is some 40% greater at the top than at the bottom. The tapered walls of the fluidized bed chamber 36 allows for a gradual decrease in upflow velocity upwardly through the chamber 36. This reduction in flow rate helps to prevent the sand or other particulate material from being flushed out of the chamber 36. A channel-section launder extends the full length of the chamber 36 adjacent the top thereof. On either side of the launder is a weir 39 with V-shaped slots 41 cut in its upper edge. The waste water flows through the slots 41 in the weirs 39 and drops into the launder 38. This dropping action is useful in freeing gas bubbles from the waste water stream.

The launder 38 discharges at one end into a distribution chamber 42 of the reactor tank 10. The waste water drops from the launder 38 onto a splash plate 43 and then over the edges of splash plate 43 into the distribution chamber 42.

The waste water stream is divided in the distribution chamber. The majority flows through a duct 44 into a discharge chamber 45. The recirculation pipe 23 exits from the reactor tank 10 out the bottom of chamber 45 and the influent pipe 19 enters into the reactor tank 10 at the top of it. A low baffle 46 is placed adjacent the recirculation pipe 23 to trap sludge or sand particles in the chamber 45.

A minority of the waste water entering into the distribution chamber 42 passes beneath a baffle 47 flowing through a bed of settled sludge as it does so. As the waste water rises on the downstream side of the baffle 47 it enters into a transversely extending discharge duct 48 which has a plurality of orifices spaced apart along its underside. The duct 48 communicates with discharge pipe 49 which rises vertically into an inverted U-shaped gas trap and then discharges horizontally from the reactor tank 10. A vent pipe 51 carries gas collected in the gas trap into the headspace of the reactor tank 10.

The operation of the fluidised bed reactor is under solid state control to monitor the operating parameters of the system and to adjust its operation in accordance with perceived changes in those parameters.

I claim:

1. A fluidised bed waste water treatment reactor, comprising a reactor tank containing particulate media, an array of perforated distribution pipes disposed in a substantially horizontal array adjacent the bottom of the reactor tank for introducing fluidising liquid substantially uniformly over the cross-sectional area of the reactor tank, collection means to draw off liquid from adjacent the top of the reactor tank, a pump to recirculate the liquid drawn off by the collection means to the distribution pipes, inlet means to introduce waste water into the fluidised bed reactor and outlet means to discharge treated waste water from the fluidised bed reactor, characterised in that a header tank is positioned between the recirculation pump and the distribution pipes externally of the reactor tank and in that each said distribution pipe leads off, individually, from the header tank externally of the reactor tank such that there is access to the individual distribution pipes externally of the reactor tank.

2. A fluidised bed waste water treatment reactor as claimed in claim 1 in which the cross-sectional area of the reactor tank increases substantially uniformly over an expansion zone within the reactor tank equal to at least half the total height of the reactor tank such that the cross-sectional area of the tank at the top of the expansion zone is at least 30% greater than the cross-sectional area at the bottom of the expansion zone.

3. A fluidised bed waste water treatment reactor as claimed in claim 1 in which the distribution pipes are disposed in a parallel array slightly above the floor of the reactor tank.

4. A fluidised bed waste water treatment reactor as claimed in claim 1 in which each distribution pipe extends through the full width of the reactor tank and opens outwardly through side wall of the reactor tank distal to the header tank, the said open end being provided with a cap or a stop valve.

5. A fluidised bed waste water treatment reactor as claimed in claim 1 in which each distribution pipe is connected to the header tank by a removable angled connection such that by disconnection of the header tank from the distribution pipe free, straight line, access may be obtained to the inside of the distribution pipe.

6. A fluidised bed waste water treatment reactor as claimed in claim 1 in which the collection means comprises a launder running substantially the full length of the reactor tank and a weir over which the liquid may flow from the reactor tank and fall into the launder.

7. A fluidised bed waste water treatment reactor as claimed in claim 6 in which a settling tank is provided into which the launder discharges, a splash plate being provided onto which the liquid leaving the launder falls before entering the settling tank.

8. A fluidised bed waste water treatment reactor as claimed in claim 1 in which an anti-siphon loop is operatively, positioned between the recirculation pump and the header tank.

9. A fluidised bed waste water treatment reactor as claimed in claim 1 in which each distribution pipe extends a short way upwardly with the header tank.

10. A fluidised bed waste water treatment reactor as claimed in claim 1 in which a baffle of triangular cross-sectional shape is provided in the bottom of the reactor tank between each pair of distribution pipes.

11. A fluidised bed waste water treatment reactor as claimed in claim 10 in which each baffle has a height at least four times the distance between the bottom of the reactor tank and the centre line of each distribution pipe.

12. A fluidised bed waste water treatment reactor as claimed in claim 11 in which each baffle has a height at least ten times the said distance.

* * * * *